NUMBER SCANNING CIRCUIT

Filed Nov. 29, 1954 4 Sheets-Sheet 1

INVENTOR
G. C. IRWIN
BY
ATTORNEY

NUMBER SCANNING CIRCUIT

Filed Nov. 29, 1954 4 Sheets-Sheet 2

INVENTOR
G. C. IRWIN
BY [signature]
ATTORNEY

NUMBER SCANNING CIRCUIT

Filed Nov. 29, 1954 4 Sheets-Sheet 3

INVENTOR
G. C. IRWIN
BY [signature]
ATTORNEY

Sept. 2, 1958 G. C. IRWIN 2,850,237

NUMBER SCANNING CIRCUIT

Filed Nov. 29, 1954 4 Sheets-Sheet 4

INVENTOR
G.C. IRWIN
BY
[signature]
ATTORNEY

United States Patent Office

2,850,237

Patented Sept. 2, 1958

2,850,237

NUMBER SCANNING CIRCUIT

Gordon C. Irwin, Fair Haven, N. J., assignor to Bell Telephone Laboratories, Incorporated, New York, N. Y., a corporation of New York Application November 29, 1954, Serial No. 471,683

12 Claims. (Cl. 235—61.7)

This invention relates to systems for summarizing accounting records, and more particularly to systems for obtaining and recording specific portions of accounting records from general groups thereof.

In recapitulating the records in automatic accounting systems, a summarizer of the kind shown and described in Patent 2,572,132 issued to H. A. Giroud et al. on October 23, 1951 is utilized. Giroud et al. teach the use of the summarizer in telephone message accounting to accept from a prepared record the message unit calls for each calling number and to consolidate such message units into a single summary for each number. Basically, Giroud et al. summarizer comprises a reader for the input tape containing the entries to be summarized, a relay control circuit, and a perforator for the output tape on which the summaries are recorded.

The input tape contains a separate entry for each message unit call, each of the entries consisting of the calling line directory number and the number of unit charges for the call on the same line if less than 9 or on the next line if more than 9, all of said entries being arranged on the tape in order of ascending calling number. The summarizer makes a comparison of the calling number of each entry with that of the preceding entry and adds together all the message units associated with the same calling number. This procedure continues for as long as the compared numbers are identical. When an entry is sensed on which the calling number does not correspond with that of the previous entry, the summary of message units for the preceding calling number is perforated on the summary tape and the summarizing process commences to operate on the next higher calling number. The same procedure applies and continues for all of the entries and calling numbers on the tape. For a complete description of the operation of the summarizer, an examination may be made of the above-identified Giroud et al. patent which is incorporated herein by reference.

In utilizing the summarizer of Giroud et al. in telephone message accounting, difficulty arises in ascertaining the summary of telephone usage of a particular subscriber for whom a final bill may have to be prepared prior to the preparation of bills for the remainder of the subscribers whose records are impressed on the same tape. This situation may arise where a final bill is required for a particular subscriber who has discontinued service, and the summary tape in question represents an intermediate summary, bills for the remainder of the subscribers not ordinarily being printed until a later, and final, summary is made.

It is, therefore, an object of this invention to expeditiously and economically compile summaries for selected individual subscribers from intermediate summaries containing accounting record summaries for a relatively large number of subscribers.

A further object of the invention is to provide means whereby the records of selected subscribers may be obtained from a general grouping of subscribers in automatic accounting records without the necessity of producing records for any but the selected subscribers.

The present invention accomplishes these and other objects by a modification of the summarizer device shown and described in the Giroud et al. patent, said modification comprising a key field, registers and novel circuit arrangements that permit the registration of the desired subscriber number in the key field, enable the summarizer to sense the summary tape for the number registered in the key field, and cause said summarizer to record on another tape the desired number and associated message units.

In operation, the desired subscribed number is set up on the key field. A tape, which contains the directory numbers and the summary of charges for each subscriber number, is then inserted into the summarizer. The latter then operates to campare each number sensed with the number registered in the key field. As the summarizer reader senses a number lower than the number registered in the key field, the input tape is automatically stepped to the next subscriber number. When the reader senses the number registered in the key field, said number along with the message units for said number, are stored in a register. When the reader senses a number higher than the one set up in the key field the information contained in the register is perforated on the output tape and the movement of the input tape is automatically arrested. The next higher subscriber number for which a summary entry is desired is then set up on the key field and the foregoing operation is repeated. This procedure continues until all of the desired subscriber numbers (or other indices) and their associated message units or quantities are obtained. A relay is then operated which automatically advances the tape to its final termination.

These and other features and objects of the invention will be readily understood from the following detailed description and the accompanying drawings in which.

Figure 1:
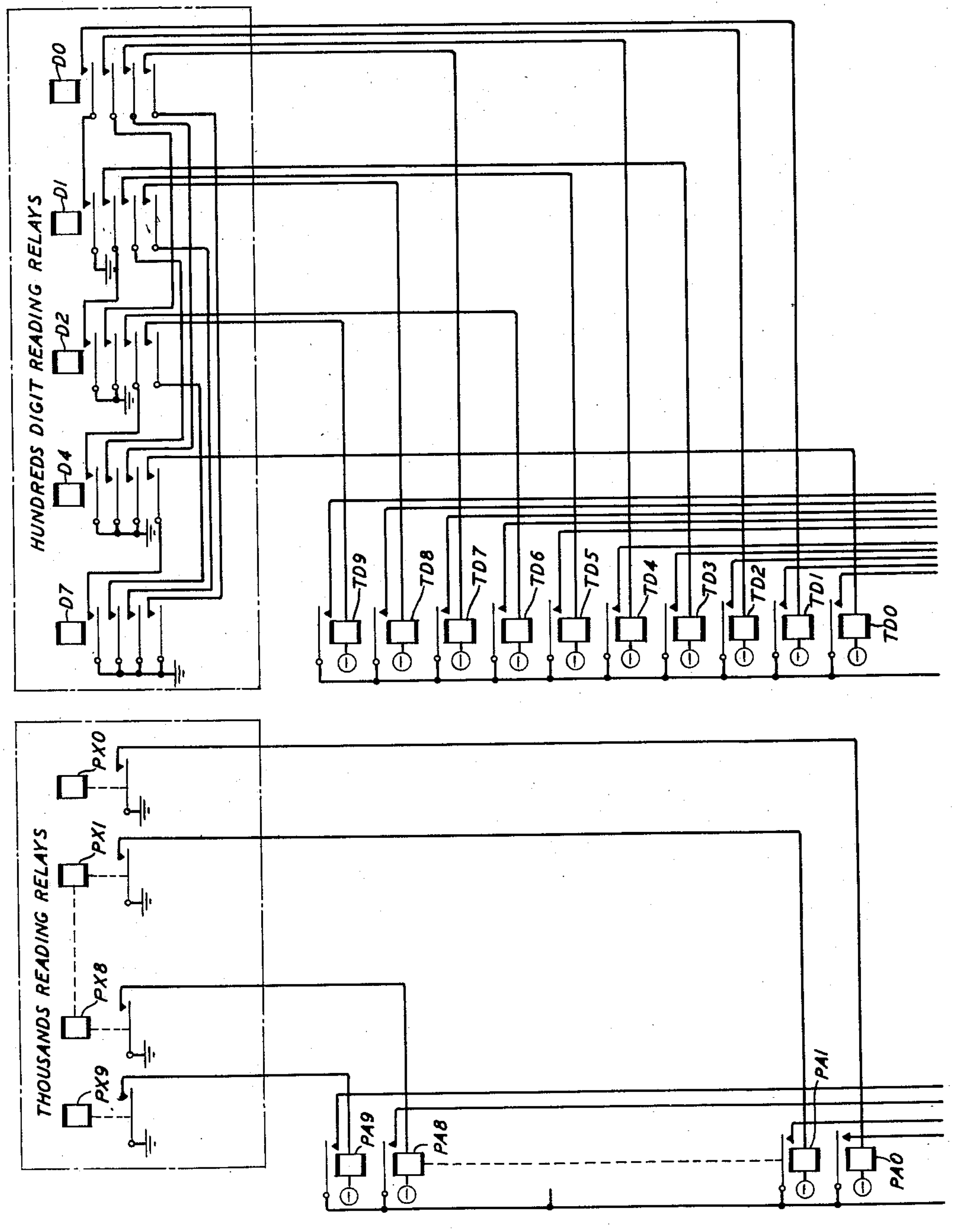
Figs. 1 through 4 show a circuit arrangement incorporating the invention into a summarizer of the Giroud et al. patent, by way of example.

In the drawing and specification only that portion of the Giroud et al. summarizer which is necessary to an understanding of the present invention is set forth, reference being made to the Giroud et al. patent for a more complete disclosure and description thereof. Like reference designations are used herein to designate similar parts of the patended machine, relays UND, OV, SN, SN1 and SCAN being added for the purpose of the present invention.

Figure 2:
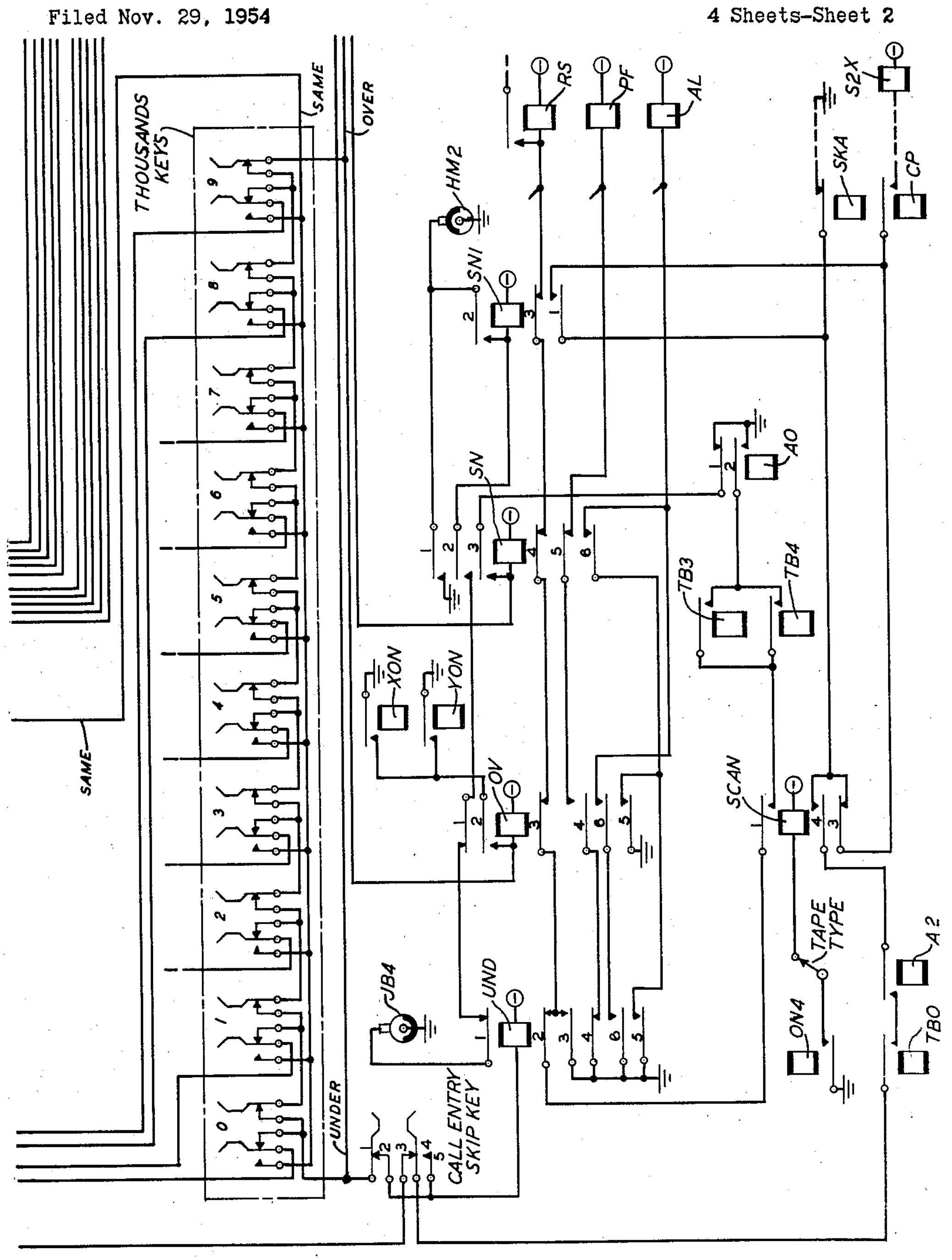
Figure 6:
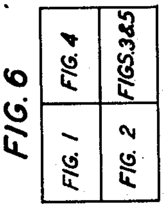
Fig. 6 shows how the above figures should be arranged with respect to one another to fully disclose the invention.
Figure 3:
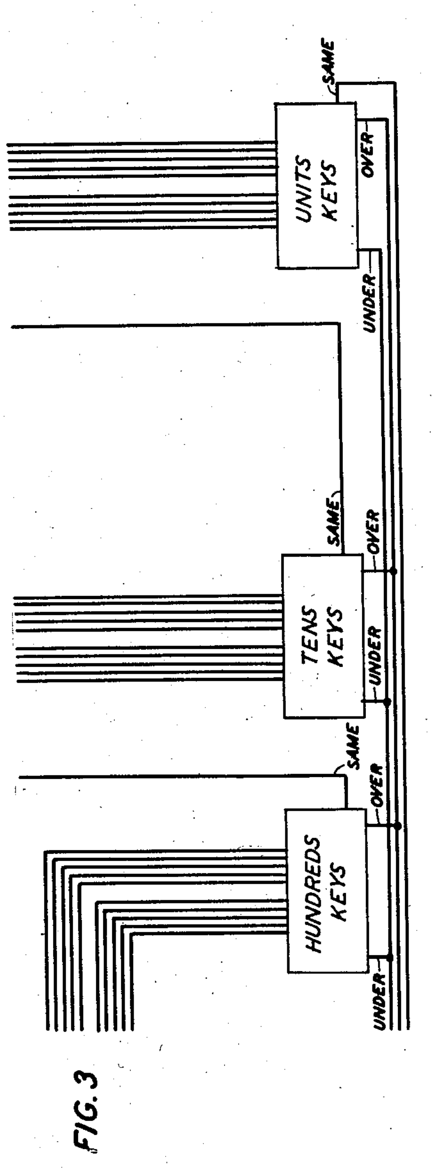
Figure 4:
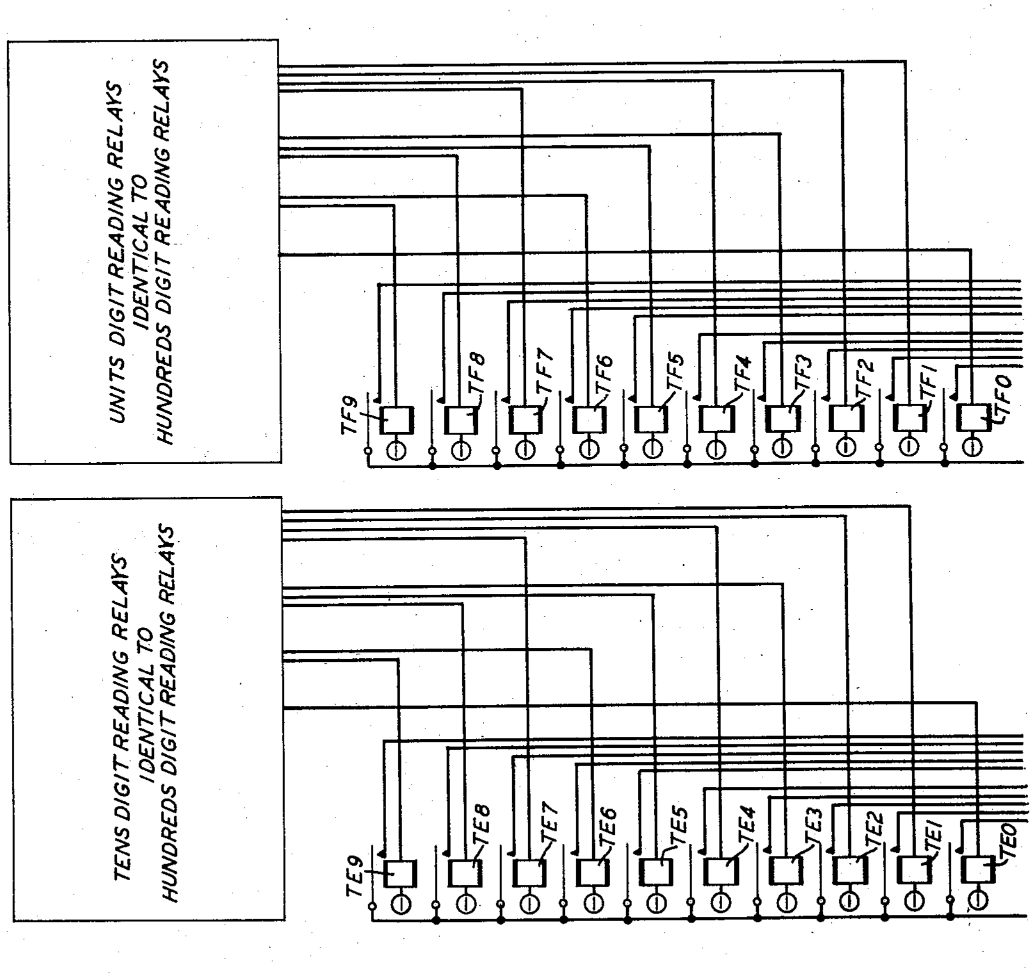

Referring first to Figs. 2 and 3, a key field is shown on which the desired subscriber number is impressed, the field of ten digit keys for the thousands digit of the number being shown in detail in Fig. 2, while similar key fields for the hundreds, tens and units are shown in box form in Fig. 3. Thousands digit reading relays PX9 through PX0, and hundreds digit reading relays D7, D4, D2, D1 and D0 are shown in Fig. 1, arrangements similar to the hundreds digit reading relays for the tens digit reading relays and the units digit reading relays being set forth in box form in Fig. 4. Translated decimal digit relays PA0 through PA9 are adapted to cooperate with the thousands digit reading relays PX0 through PX9. Similarly, the hundreds, tens and units digit reading relays are adapted to cooperate with and are interconnected with the respective translated decimal digit relays TD0 through TD9, TE0 through TE9, and TF0 through TF9. The reading relays are responsive to perforations in the paper tape passing through the summarizer reader (not shown). Different combinations of perforations will, through sensing devices, energize the corresponding reading relays which, in turn, actuate the appropriate translated decimal digit relays. If the perforations, as sensed by the reader, are equivalent to a directory number lower in magnitude than the desired subscriber number, the output lead UND from the key field will be energized, operating under relay UND and eventually actuating the reader step relay RS, which steps the perforated paper tape to the next line. If the perforations sensed by the reader are equivalent to the number impressed on the key field, then the comparator arrangement functions to actuate the output lead SAME from the key field, which in turn actuates the relays SN and SN1, enabling the summarizer to register the summary entry of the directory number and chargeable message units. Should the perforations encountered by the summarizer reader be those of a number higher than the desired directory number, lead OVER from the key field will be energized, in turn actuating the over relay OV which functions to perforate the registered summary entries, if any, and ultimately to stop further sensing of the reader tape. It is to be noted that although relays PX0 through PX9 are referred to as "reading relays" to achieve uniformity of expression with reference to the hundreds, tens and units digit reading relays, the function of relays PX0 through PX9 is not, strictly, to read. These relays are responsive to a thousands selector (not shown) whose position determines the magnitude of the thousands digit. The position of the thousands selector is checked against the thousands digit of each directory number as read from the tape. Consequently, the thousands reading relays PX0 through PX9 are responsive indirectly, rather than directly, to the perforations in the paper tape, as are the hundreds, tens and units reading relays.

By the same token, to provide for uniformity of designation and facility in description, relays PA0 through PA9 are referred to as translated decimal digit relays although they are directly responsive to relays PX0 through PX9.

Additional relays shown in Fig. 2 but not discussed above, will be treated in the following detailed description, the above being a general description of the invention to serve as a basis for the detailed discussion to follow.

To facilitate the detailed description of the invention, it will be assumed that the output tape of the summarizer having been produced in the usual manner is reinserted into the summarizer reader and that the first entry thereon to be located and reproduced on a separate output tape with the aid of the present invention bears the directory number or index of 8412. Accordingly, this number is set up on the key field.

When the output tape is fed into the summarizer reader there are three distinct possibilities, namely, that the number first encountered is less than, equal to, or greater than the number registered in the key field. The functioning of the apparatus will be described under each of these possibilities in the order indicated.

*Number read by summarizer reader is less than desired subscriber number*

To initially condition the circuit for operation the Tape-Type switch shown in Fig. 2 is actuated. A circuit may then be traced from ground through the contacts on relay ON4, previously operated by means not shown, through the Tape-Type switch, winding of relay SCAN, to negative battery, operating said relay. Let it be assumed that the number first sensed by the summarizer reader is 1654, which is lower than number 8412 registered in the key field. The reader sensing pins, by falling into the respective perforations on the output tape, function to actuate reading relay PX1 in the thousands group relays, relays D2 and D4 in the hundreds group, relays D1 and D4 in the tens group (not shown), and relays D0 and D4 in the units group (not shown). The different combinations of relays (in the well-known two-out-of-five code) in turn combinationally act to energize translated decimal digit relays PA1, TD6, TE5 and TF4, over obvious circuits, as clearly indicated by the hundreds relays in Fig. 2. An additional circuit is then established from an off-normal ground through the contacts of relay SKA, No. 4 contacts of relay SCAN, contacts of relays A2 and TB0 previously operated by means later to be explained, contacts 4 and 3 of the Call Entry Skip Key, contacts of operated relay PA1, and to left normal contacts of digit key 1 of the thousands key field. From said key the circuit may be further traced to the output lead UNDER through right contacts of the digit key 0, contacts 1 and 2 of the Call Entry Skip Key, the winding of relay UND, to battery. Energization of relay UND completes a circuit from ground through its No. 3 contacts, No. 3 contacts of relay OV, No. 4 contacts of relay SN, No. 3 contacts of relay SN1, the winding of the reader step relay RS, to battery. Actuation of the reader step relay RS functions to step the output tape to the next line, as described in the abovementioned Giroud et al. patent.

It will be noted from an examination of Figs. 1 through 4 that the function of the present apparatus is essentially to compare the digits read by the summarizer reader from the tape with those registered on the key field. If the thousands digit of the number read is lower in magnitude than the thousands digit registered on the key field then, of course, the number read must be lower than the number registered, in which event output lead UNDER in the thousands key field is actuated and relay UND is operated, as already described. If the thousands digit of the number read is the same as the thousands digit registered, then the output lead SAME in the thousands key field is energized, as will be shown. A further comparison is then made between the hundreds digit read and the hundreds digit registered. Here again, if the digit read is lower than the digit registered, lead UNDER is actuated and relay UND operated. If the digit read is the same as the digit registered, the output lead SAME is actuated and a still further comparison is then made between the tens digit read and the tens digit registered, the comparing process continuing with the units digit.

*Number read by summarizer reader is the same as the desired subscriber number*

Let it now be assumed that the number read by the summarizer reader is the same as the one set up in the key field, i. e., 8412. As a result, the thousands, hundreds, tens and units digit reading relays corresponding to the two-out-of-five code perforations of the digits 8412 are actuated. These reading relays in turn energize the translated decimal digit relays PA8, TD4, TE1 and TF2 over obvious circuits. The actuation of relays TB0 and A2 referred to above but not explained is due to the code designations of the alternate directory number and message unit lines, where the number of message units is more than 9. The directory number lines are identified by the code perforations representing the digits 20, which, when read, actuate relays A2 and TB0. The message unit lines are identified by the digits 03 or 04 which, when read, cause the actuation of relays A0 and TB3 or TB4, respectively.

Again, assuming that the Tape-Type switch is closed and that relay SCAN is energized, a circuit may be traced from ground through the contacts of relay SKA, No. 4 contacts of relay SCAN, contacts of relays A2 and TB0, contacts 4 and 3 of the Call Entry Kkip Key, contacts of the operated relay PA8, to the thousands key number 8. The circuit then continues through the left front contacts of said key, output lead SAME of the thousands key field, contacts of relay TD4, to the hundreds digit key number 4 (not shown), lead SAME of the hundreds key field, contacts of relay TE1 to the tens digit key No. 1 (not shown), lead SAME of the tens key field, contacts of relay TF2, units digit key No. 2

(not shown), lead SAME, winding of relay SN, to battery. Relay SN operates and locks over its No. 3 contacts to ground on the No. 1 contacts of relay A0, which is normal at this time. This operation of relay SN occurs during the time that the sensing pins of the reader are engaging the record, and those pins which are opposite perforations have actually penetrated such perforations. When the sensing pins are withdrawn from their respective perforations, the auxiliary control contacts JB4 on the reader shaft are operated. As a result, a circuit is completed from ground through said contacts, the No. 1 contacts of relay UND, No. 1 contacts of relay OV, No. 2 contacts of relay SN, winding of relay SN1, to battery. Relay SN1 operates and locks over its No. 2 contacts to ground on the No. 1 contacts of relay SN. A circuit may now be traced from ground through the contacts of relay SKA, No. 1 contacts of relay SN1, contacts of relay CP (previously operated by means not shown) to negative battery through the winding of a relay S2X in the summarizer. In response to the operation of said relay, the summerizer functions to advance the tape to the next line, which contains the number of message units to be charged to directory number 8412. In reading this line, relay A0 is energized, unlocking relay SN which releases. The release of relay SN, however, will not cause the release of relay SN1, the latter holding throught auxiliary interrupter HM2 which is made during the "make" period of the reading cycle and therefore in a conductive position at the time relay A0 operates.

The summarizer continues to operate according to program by reading the information contained in the message unit line, transferring the message units to an associated register (not shown) and subsequently stepping the input tape to the next line. When the sensing fingers are withdrawn on the "break" cycle of the reader, auxiliary control contacts HM2 are opened, releasing relay SN1 and reconditioning the scanning portion of the circuit for later operation.

*Number read by summarizer reader is higher than the desired subscriber number*

Assuming that the reader tape has been stepped to the next line, the directory number on said line is compared to the one registered in the key fields. In this case the new directory number will be higher than the desired directory number, since it has been assumed that the number previously read is equal to the desired directory number. A circuit may now be traced from ground through the contacts of relay SKA, No. 4 contacts of relay SCAN, contacts of relays A2 and TB0, thence as previously traced through the translated decimal digit relays corresponding to the number read, and finally to output lead OVER from one of the four digit field depending on which field the digit read is greater than the registered digit. From the output lead OVER the circuit is completed through relay OV to negative battery. Either relay XON or YON will have been previously operated, by means not shown, as a result of the registration of the message units in the summarizer. A locking circuit for relay OV, therefore, may be traced from ground through the contacts of relay XON or YON, No. 2 contacts of relay OV, to battery. A circuit is now established to operate the perforator relay PF, and may be traced from ground through the No. 4 contacts of relay UND, No. 4 contacts of relay OV, No. 5 contacts of relay SN and thence through the winding of the perforator PF, to battery. The perforator relay PF now functions as described in the Giroud et al. patent to operate the perforator (not shown), which will record the index or directory number and quantity or message units stored in the register circuit of the summarizer, also not shown. Thereafter, the directory number and message unit registers are released.

After the perforation cycle described above is completed relay XON or YON, previously operated, is released. As a result, the locking circuit for relay OV is opened and relay OV releases. Relay PF also releases. Since the reader has not been stepped the same directory number line previously read will be reread, the same circuit previously traced applying, and resulting in the reoperation of relays OV and PF, the latter relay functioning to commence the perforation cycle. However, since no information is now stored in the directory number or message unit registers, a time-out circuit in the summarizer, not disclosed herein, operates to curtail all further functioning. The next higher desired subscriber number is now set up in the key field and the foregoing operations are repeated. After the highest subscriber number has been perforated, the Call Entry Skip Key is operated. This operates relay UND through the circuit which may be traced from ground through the contacts of relay SKA, contacts 4 of relay SCAN, contacts of relays A2 and TB0, contacts 4 and 5 of the Call Entry Skip Key, the winding of relay UND, to battery. When relay UND is operated, an additional circuit may be traced from ground through contacts 3 of relay UND, contacts 3 of relay OV, contacts 4 of relay SN, contacts 3 of relay SN1, through the reader step relay RS, to negative battery. Actuation of the reader step relay advances the tape to the next line which is the message unit line. In reading the message unit line, relays A0 and TB3 or TB4 are energized. A circuit is thereupon established from ground through contacts 2 of relay A0, contacts of relay TB3 or TB4, contacts 1 of relay SCAN, contacts 2 of relay UND, contacts 3 of relay OV, contacts 4 of relay SN, contacts 3 of relay SN1, winding of reader step relay RS to battery. The tape is again advanced to the next line, which is the directory number line and the foregoing operations are repeated until the tape is stepped to its end.

If the number desired is the last number recorded on the summarizer tape, the operation is similar to that described above, with the exception that the perforation of the output tape will occur as a result of the sensing of certain end-of-tape entries, rather than the sensing of a higher number. This feature is described in detail in the patent of Giroud et al. above referred to.

An alarm AL is adapted to be operated in the event that any of the relays UND, OV or SN are energized simultaneously, indicating a false operation of at least one of the relays.

Figure 5:
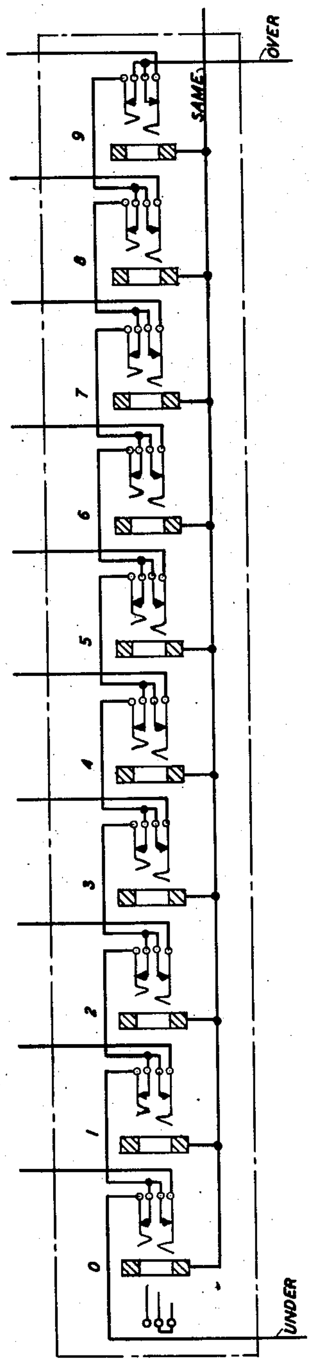
Fig. 5 is an arrangement using jacks and plugs which may be substituted for the key field of Fig. 2.

In Fig. 5 an arrangement using jacks and plugs which may be substituted for the key field of Fig. 2 is shown. In using this embodiment, plugs are inserted in the jacks corresponding to the desired subscriber number. The leads SAME, UNDER and OVER are connected in the manner shown in Fig. 2 and Fig. 3 for the key fields. The over-all operation of the invention is identical to that previously described with respect to the key fields.

While I have illustrated my invention by particular embodiments thereof, said invention is not limited in its application to the specific apparatus and particular arrangements herein disclosed. Various applications, modifications and arrangements of the invention will readily occur to those skilled in the art.

The terms and expressions which I have employed in reference to the invention are used as terms of description and not of limitation, and I have no intention in the use of such terms and expressions of excluding equivalents of the features shown and described or parts thereof but, on the contrary, intend to include therein any and all equivalents, modifications and adaptations which may be employed without departing from the spirit of the invention.

What is claimed is:

1. A scanning device comprising in combination a sensing mechanism for sensing a record having thereon a series of entries, each entry comprising an index and a quantity, each of said entires being recorded in code on said record, a key field on which the index associated with an entry is registered, means responsive to the operation of said sensing mechanism sensing an index and to the setting of said key field in accordance with the index registered therein for comparing the index sensed with the index registered, means responsive to the operation of said comparing means when the two indices agree for registering the entry corresponding to said index, and means responsive to said sensing mechanism sensing an index higher than the index registered on said key field for arresting the advance of said record in the event that said index is not contained in said record.

2. A scanning device comprising in combination a sensing mechanism for sensing a record having thereon a plurality of entries, each entry comprising an index and a quantity both recorded in code, a key field on which an index may be registered, means responsive to said sensing mechanism sensing an index on said record and to the setting of said key field in accordance with an index for comparing the index registered therein with the index of an entry sensed by said sensing mechanism, a register, means responsive to the operation of said comparing means when the two indices agree for operating said register under the control of said sensing mechanism, thereby to register therein the index and the quantity comprising the entry, and means responsive to said sensing mechanism sensing an index higher than the index registered in said key field for recording on a summary tape the entry stored in said register.

3. A scanning device comprising in combination a sensing mechanism for sensing a record having thereon a series of entries, each entry comprising an index and a quantity, a key field on which to register the index of a particular entry, means for comparing each index sensed by said sensing mechanism with the index registered on said key field, and means responsive to said sensing mechanism sensing an index higher than the index registered on said key field for arresting the advance of said record through said sensing mechanism in the event that said particular entry is not contained in said record.

4. A scanning device comprising in combination means for scanning a record having thereon a series of entries, each entry comprising an index and a quantity recorded in code, a key field on which to register the index of a particular entry, means responsive to the operation of said scanning means scanning an index for comparing said index with said particular index registered on said key field, register means responsive to the operation of said comparing means in the event that the index scanned is identical with the index registered for registering said index and its associated quantity, means responsive to said scanning means scanning an index higher than the index of said particular entry for recording said registered index and its associated quantity and restoring said register means to normal, and means responsive to the normal condition of said register and to said scanning means scanning an index greater than the index registered on said key field for arresting the advance of said record.

5. A scanning device comprising in combination a sensing mechanism for sensing a record including a plurality of entries thereon, each entry comprising an index and a quantity, a key field on which to register the index of a particular entry, means responsive to said sensing mechanism sensing the index of an entry and to the setting of said key field for the index of said particular entry for comparing the indices of said entries, and means for advancing said record to the next higher index for sensing by said sensing mechanism in the event that the index registered on said key field is greater than the index sensed by said sensing mechanism.

6. A scanning device comprising in combination means for sensing a record including a series of entries, each entry including an index and a quantity, a key field on which is registered the index of a particular entry, means responsive to said sensing means sensing an index and to the setting of said key field to the index of said particular entry for comparing the two indices, means responsive to said sensing means sensing an index higher than the index registered on said key field for arresting the advance of said record through said sensing means in the event that said particular entry is not contained in said record, and means for thereafter automatically advancing the record to its final termination.

7. A scanning device comprising in combination a sensing mechanism for sensing a record having thereon a series of entries, each entry including an index and a quantity recorded in one line or an index recorded in one line and a quantity recorded in another line, each entry being recorded in code, a plurality of digit-reading relays selectively operative in response to said sensing mechanism sensing an index, a plurality of translated decimal digit relays selectively responsive to the selective operation of said digit-reading relays for translating the arbitrary code indication of a sensed index to a decimal code indication, a key field on which is registered an index in its decimal code, means responsive to the selective operation of said translated decimal digit relays and to the setting of said key field to an index for comparing the index registered on said key field with the index represented by said operated translated decimal digit relays, and means responsive to the operation of said translated decimal digit relays for an index lower than the index registered on said key field for advancing said record to the next line.

8. A scanning device in accordance with claim 7 wherein said means for advancing said record includes other means to further advance said record in the event that said record has been previously advanced to a line containing a quantity only.

9. A scanning device comprising in combination means for scanning a record having thereon a series of entries, each entry comprising an index and a quantity, each of said entries being recorded in code on said record, said scanning means including a reading mechanism and a plurality of digit-reading relays selectively responsive to said reading mechanism reading the index of an entry for indicating in code the index sensed by said reading mechanism, a plurality of translated decimal digit relays responsive to the operation of said digit-reading relays for translating said code indication of the index to a decimal indication, a key field on which to register an index, means responsive to the operation of said translated decimal digit relays and to the setting of said key field for the index registered therein for comparing said index with the index represented by the operated translated decimal digit relays, and a storage register responsive to the operation of said comparing means for registering the entry identified by the index registered in said key field when the compared indices are the same.

10. A scanning device comprising in combination a reading mechanism for reading a record having thereon a plurality of entries, each entry including a four-digit index and a quantity recorded in one line or an index recorded in one line and a quantity recorded in another line, each of said entries being recorded in code on said record, thousands, hundreds, tens and units digit-reading relays selectively responsive to said reading mechanism reading an index for indicating in code the index sensed by said reading mechanism, thousands, hundreds, tens and units translated decimal digit relays respectively and selectively responsive to the operation of said thousands, hundreds, tens, and units digit-reading relay for translating said index into its decimal equivalent, thousands, hundreds, tens and units key fields for registering an index therein, means responsive to the setting of said fields for an index and to the operation of said translated decimal digit relays representing an index for comparing the two indices, means responsive to the operation of said comparing means when the two indices agree for registering the entry represented by each of said indices, and means responsive to the subsequent operation of said digit-reading relays for an index higher than the index registered in said key filed for recording said entry on a summary record.

11. A scanning device comprising in combination a sensing mechanism for sensing a record having perforated thereon a series of entries, each entry comprising an index and a quantity, each entry being recorded in code, a plurality of digit-reading relays selectively responsive to said sensing mechanism sensing the index of an entry for indicating said index in code notation, a plurality of translated decimal digit relays responsive to said digit-reading relays for translating the code notation of the index to a decimal notation, a key field settable to register the index of an entry, means responsive to the setting of said key field for an index and to said translated decimal digit relays operated to indicate an index for comparing the two indices, and means responsive to said sensing mechanism sensing an index higher than the index registered in said key field in the event that said last-mentioned index is not contained in said record for arresting the advance of said record.

12. A scanning device comprising in combination a reading mechanism for reading a record having thereon a plurality of entries, each entry including a four-digit index and a quantity recorded in one line or an index recorded in one line and a quantity recorded in another line, each of said entries being recorded in code perforations on said record and arranged on said record in ascending order of magnitude, thousands, hundreds, tens and units digit-reading relays selectively operative in response to said reading mechanism successively reading indices for indicating said indices in their respectve codes; thousands, hundreds, tens and units translated decimal digit relays selectively responsive to the operation of said thousands, hundreds, tens and units digit-reading relays for translating the code notations of said indices to corresponding decimal notations; thousands, hundreds, tens and units key fields settable to register the index of an entry; means responsive to the setting of said key fields for said index and to the operation of said translated decimal digit relays for comparing the two indices, means responsive to the operation of said translated decimal digit relays for an index lower than the index registered in said key fields for advancing said record to the next higher index, storage means responsive to the operation of said translated decimal digit relays for an index identical to the index registered in said key fields for storing said index and its associated quantity, means responsive to the operation of said translated decimal digit relays for an index higher than the index registered in said key fields for recording said stored index and quantity and releasing said storage means, means responsive to the release of said storage means for arresting the advance of said record if the index registered on said fields is lower in magnitude than the index indicated by said translated decimal digit relays and no entry is stored in said register, means responsive to said reading mechanism reading an index higher than the index registered on said key fields for arresting the advance of said record if the entry identified by the index registered in said key fields is not contained in said record, and means for automatically advancing the record to its final termination in the event that said particular entry is not contained in said record.

References Cited in the file of this patent

UNITED STATES PATENTS

| | | |
|---|---|---|
| 2,572,132 | Giroud et al. | Oct. 23, 1951 |
| 2,580,768 | Hamilton et al. | Jan. 1, 1952 |